United States Patent
Bickert et al.

(10) Patent No.: US 6,235,848 B1
(45) Date of Patent: May 22, 2001

(54) CROSSLINKABLE MOLDING MATERIAL

(75) Inventors: Peter Bickert, Atlanta, GA (US); Hans Guenther Wey, Muelheim (DE)

(73) Assignee: Huels Aktiengesellschaft, Marl (DE)

( * ) Notice: Subject to any disclaimer, the term of this patent is extended or adjusted under 35 U.S.C. 154(b) by 0 days.

(21) Appl. No.: 09/261,191

(22) Filed: Mar. 3, 1999

(30) Foreign Application Priority Data

Mar. 3, 1998 (DE) .............................................. 198 08 886

(51) Int. Cl.[7] .......................... C08F 30/08; C08F 130/08; C08F 230/08
(52) U.S. Cl. ........................ 525/326.5; 525/393; 524/264; 523/212; 526/279
(58) Field of Search ............................... 525/326.5, 393; 524/264; 523/212; 526/279

(56) References Cited

U.S. PATENT DOCUMENTS 4,816,517 * 3/1989 Wilkus et al. ........................ 525/194
5,994,474 * 11/1999 Wey et al. ......................... 525/326.5

* cited by examiner

*Primary Examiner*—Nathan M. Nutter
*Assistant Examiner*—Olga Asinovsky
(74) *Attorney, Agent, or Firm*—Oblon, Spivak, McClelland, Maier & Neustadt, P.C.

(57) ABSTRACT

A crosslinkable molding material is provided that includes:

(a) 3 to 98 parts by weight of one or more thermoplastics and (b) 2 to 97 parts by weight of a substantially amorphous poly-α-olefin which is grafted with a silane which has at least one olefinic double bond and one to three alkoxy groups bonded directly to the silicon, this grafted poly-α-olefin having a melt viscosity at 190° C. in the range from 100 to 50,000 mPa.s.

A molding material or shaped articles are provided that have high impact strength, high tensile strength and a smaller tendency to creep.

17 Claims, No Drawings

CROSSLINKABLE MOLDING MATERIAL

BACKGROUND OF THE INVENTION

1. Field of the Invention

The invention relates to a crosslinkable molding material which contains a silane-grafted poly-α-olefin.

2. Discussion of the Background

Polymers and polymer blends have for years become increasingly popular as materials which can be processed by a thermoplastic method. However, there is a substantial dependence of important performance characteristics, such as, for example, impact strength, tensile strength and tendency to creep, on the molecular weight. For this reason, the polymeric material should have as high a molecular weight as possible in order to possess a high impact strength, a high tensile strength and only a small tendency to creep in the finished article. However, when the molecular weight increases, the melt becomes so highly viscous that it can scarcely be processed. For this reason, if readily processible molding material is desired, it is necessary to make a compromise and accept a poorer impact strength and higher tendency to creep. This applies in particular to injection molding materials, which must be particularly readily flowable.

A further problem is encountered in the case of polymer blends. Since most polymers are incompatible with one another, it is initially possible, with strong shearing, to distribute one blend component in dispersed form or as a network in the other blend component. However, if the melt then enters a zone of low shearing or no shearing, for example a mold, the initially finely divided phase coalesces to larger droplets. The article obtained is thus extremely brittle after solidification and hence unusable.

In special cases, it is possible to achieve good dispersibility without subsequent coalescence by chemically linking the two blend components. In such cases, the two phases adhere to one another. The extent of the adhesion is frequently not sufficient, however, to achieve the desired high impact strength. This problem occurs if one attempts to impart impact strength to thermoplastic polyesters, such as polyethylene terephthalate or polybutylene terephthalate, by incorporating, or compounding rubbers which are functionalized, for example maleic anhydride-functionalized ethylene/propylene rubber (EPM) or ethylene/propylene/diene rubber (EPDM). For a sufficient reaction of the terminal OH groups of the polyester with the anhydride groups of the rubber, a subsequent solid-phase postcondensation is required, which gives rise to high process costs.

Therefore, there is a continuing need to provide molding materials which are readily processible and nevertheless give shaped articles having very high impact strength, high tensile strength and very small tendency to creep.

There is also a need for molding materials into which blend components can be readily mixed to form blends having stable phases.

There is also a need for polymer blends that have stabilized morphology and in which there is strong phase adhesion at the boundary.

SUMMARY OF THE INVENTION

Accordingly, one object of the present invention is to provide molding materials which are readily processible and nevertheless give shaped articles having very high impact strength, high tensile strength and very small tendency to creep.

A second object of the present invention is to provide molding materials into which blend components can be readily mixed to form blends having stable phases.

Another object of the present invention is to provide polymer blends that have stabilized morphology and in which there is strong phase adhesion at the boundary.

These and other objects are achieved according to the invention, by providing molding material, that includes:

(a) 3 to 98 parts by weight of one or more thermoplastic polymers, (b) 2 to 97 parts by weight of a substantially amorphous, silane-grafted poly-α-olefin, wherein the grafting silane includes at least one olefinic double bond and one to three alkoxy groups bonded directly to the silicon, and wherein the silane-grafted poly-α-olefin has a melt viscosity at 190° C. in the range of 100 to 50,000 mPa.s; and wherein the molding material contains 0 to less than 0.5 parts by weight of a reinforcing agent.

Another embodiment of the present invention provides a molded article, that includes the molding material of the invention.

Another embodiment of the present invention provides a method for preparing a molding material that includes:

(a) 3 to 98 parts by weight of one or more thermoplastics, (b) 2 to 97 parts by weight of a substantially amorphous, silane-grafted poly-α-olefin, wherein the grafting silane includes at least one olefinic double bond and one to three alkoxy groups bonded directly to the silicon, and wherein the silane-grafted poly-α-olefin has a melt viscosity at 190° C. in the range of 100 to 50,000 mPa.s; and wherein the molding material contains 0 to less than 0.5 parts by weight of a reinforcing agent;

wherein the process includes grafting a substantially amorphous poly-α-olefin with the grafting silane, and mixing with one or more thermoplastic polymers.

DESCRIPTION OF THE PREFERRED EMBODIMENTS

A more complete appreciation of the invention and many of the attendant advantages thereof will be readily obtained as the same becomes better understood by reference to the following detailed description.

Preferably, the molding material of the present invention contains the following components:

(a) 3 to 98 parts by weight of one or more thermoplastics, (b) 2 to 97 parts by weight of a substantially amorphous poly-α-olefin which is grafted by free radical method with a silane which has at least one olefinic double bond and one to three alkoxy groups bonded directly to the silicon, this grafted poly-α-olefin having a melt viscosity at 190° C. in the range of from 100 to 50,000 mPa.s, measured according to DIN 53019 in a rotational viscometer at a shear rate of 30.5 $s^{-1}$, and the parts by weight of (a) and (b) summing to 100, and furthermore the molding material containing 0 to less than 0.5 part by weight of a reinforcing agent.

Molding materials having a higher content of reinforcing agents are the subject of German Patent Application No. 198 08 888.4 filed Mar. 3, 1998, the entire contents of which are hereby incorporated by reference.

In a more preferred embodiment, the molding material contains the following components:

(a) 44.5 to 98 parts by weight of one or more thermoplastics and (b) 2 to 55.5 parts by weight of a substantially amorphous, silane grafted poly-α-olefin.

In a particularly preferred embodiment, the molding material contains the following components:

(a) More than 80 to 97 parts by weight of one or more thermoplastics and (b) 3 to less than 20 parts by weight of a substantially amorphous, silane-grafted poly-α-olefin.

The thermoplastic of component (a) may be, for example, a polyolefin, a polystyrene, a polyphenylene ether, a polycondensate, such as polyester or polyamide, a polyurethane and/or a rubber.

The polyolefins are not particularly limiting, and any polyolefin known to those of ordinary skill may be used, for example polyethylene, polypropylene and poly-1-butene, but also copolymers of ethene, propene or 1-butene, either as random copolymers, such as, for example, LLDPE or propene/ethene random copolymers containing about 1–15% by weight of ethene, or as block copolymers, such as, for example, propene/ethene block copolymers. Likewise, the polyolefin may be a substantially amorphous polyolefin, as can be used as a grafting base for the component (b). The polyolefin may also contain a rubber as an impact modifier, for example ethene/propene rubber (EPM) or ethene/propene/diene rubber (EPDM).

Preferably, the polystyrene may be used either as such or in rubber-modified form; the choice of the rubber, for example butadiene rubber (BR), EPDM, styrene/butadiene/styrene block polymers (SBS) or polyoctenamer (TOR), being uncritical. The polystyrene may be present as a homopolymer; however, it may also contain comonomers, such as α-methylstyrene, acrylonitrile, methyl methacrylate or N-phenylmaleimide, to increase the heat deflection temperature.

Polyphenylene ethers are preferably formed by oxidative coupling of 2,6 dialkylphenols; they are described, for example in U.S. Pat. Nos. 3,306,874 and 3,306,875 and in EP-A-0 122 394, the entire contents of each of which are hereby incorporated by reference. Preferably, they are used as a polymer blend with polystyrene.

Preferable polyesters are, for example, polyethylene terephthalate, polybutylene terephthalate or copolyesters which contain 1,4-cyclohexanedimethanol as a comonomer.

Any available type may be used as polyamide (PA), for example PA 46, PA 6, PA 66, PA 612, PA 1010, PA 1012, PA 11, PA 12, PA 1212 or PA 6,3 T. These types require no further explanation for a person skilled in the art.

Preferable polyurethanes are those which can be processed by a thermoplastic method, the type of monomers used being uncritical.

The following may be mentioned as preferable rubbers: EPM, EPDM, SBS, hydrogenated styrene/butadiene/styrene block polymers (SEBS), SIS, styrenelbutadiene rubber (SBR), butadiene rubber (BR), silicone rubber, natural rubber (NR), butyl rubber and chloroprene rubber. It is known to a person skilled in the art that such rubbers may be present in the rubber compounds as mixtures of a plurality of rubber types, the compounds usually also containing plasticizer oils, vulcanizing agents and, if required, vulcanization accelerators.

Preferably, atactic polypropylene, atactic poly-1-butene, ethene/propene copolymers, ethene-1-butene copolymers, ethene/propene/1-butene terpolymers, propene/1-butene copolymers, ethene/propene/1-hexene terpolymers, ethene/propene/1-octene terpolymers, ethene/1-butene/1-hexene terpolymers, ethene/1-butene/1-octene terpolymers, ethene/1-hexene/1-octene terpolymers, propene/1-butene/1-hexene terpolymers, propene/1-butene/1-octene terpolymers or propene/1-hexene/1-octene terpolymers may be used as substantially amorphous poly-α-olefin of component (b).

Preferably, a substantially amorphous poly-α-olefin having the following monomer composition is used here:

0 to 95% by weight of an α-olefin having 4 to 10 carbon atoms, 5 to 100% by weight of propene and 0 to 50% by weight of ethene.

Particularly preferably, the substantially amorphous poly-α-olefin has the composition 3 to 95% by weight of an α-olefin having 4 to 10 carbon atoms, 5 to 97% by weight of propene and 0 to 20% by weight of ethene.

The α-olefin having 4 to 10 carbon atoms is preferably 1-butene, 1-hexene or 1-octene.

The preparation of such copolymers or terpolymers is described, inter alia, in EP-A-0 023 249, the entire contents of which are hereby incorporated by reference; they are commercially available, for example, under the name VESTOPLAST.

The crystalline fraction of the substantially amorphous poly-α-olefin can be estimated, for example, by determining the enthalpy of fusion by means of the DSC method. Here, a weighed sample is first heated from $-100°$ C. to $+210C$. at a heating rate of $10°$ C./min and then cooled again to $-100°$ C. at a rate of $10°$ C./min. After the thermal history of the sample has been eliminated in this manner, heating is again effected at a rate of $10°$ C./min to $210°$ C., and the enthalpy of fusion of the sample is determined by integrating the melt peak which is attributable to the crystallite melting point $T_m$. Preferably, the enthalpy of fusion of the substantially amorphous polyolefin is not more than 100 J/g, more preferably not more than 60 J/g and particularly preferably not more than 30 J/g.

The silane to be grafted preferably has three alkoxy groups bonded directly to the silicon. Vinyltrimethoxysilane (VTMO), vinyltriethoxysilane, vinyl-tris(2-methoxyethoxy) silane, 3-methacryloyloxypropyltrimethoxysilane (MEMO; $H_2C=C(CH_3)COO(CH_2)_3—Si(OCH_3)_3$), 3-methacryloyloxypropyltriethoxysilane, vinyldimethylmethoxysilane or vinylmethyldibutoxysilane may be mentioned by way of example. In the grafting, the silane is preferably used in amounts of 0.1 to 10% by weight, more preferably 0.5 to 5% by weight, based on the polyolefin.

The unsaturated silane can be grafted onto the substantially amorphous polyolefin by methods known to those of ordinary skill in the art, for example in solution or preferably in the melt, a free radical donor being used in sufficient amount. A most preferred procedure is described in German Offenlegungsschrift 40 00 695, the entire contents of which are hereby incorporated by reference.

The grafted substantially amorphous polyolefin preferably has a melt viscosity in the range from 1000 to 30,000 mPa.s, more preferably 2000 to 20,000 mPa.s, and most preferably 3000 to 10,000 mPa.s.

Preferably, the grafted, substantially amorphous polyolefin can then be crosslinked in the mixture with thermoplastic, which is most simply achieved by the action of water. Depending on the user's requirements, this is effected by means of water vapor from the surrounding air, by water vapor which is contained in a gas stream, by steam or hot water treatment or by water which is contained in the thermoplastic (in particular in the case of polyamides; to a limited extent also in the case of polyesters). This crosslinking can be carried out on the shaped article; however, it is also possible to carry out the crosslinking in the melt or in the granules, in particular to prepare more highly viscous molding materials suitable for extrusion.

The crosslinking imparts to the molding material a higher heat deflection temperature and improved tensile strength; in addition, the phase morphology is stabilized so that no disadvantageous changes in properties occur on further processing by a thermoplastic method.

In the present invention, the fact that this crosslinking can be carried out more rapidly than when, according to the prior art, semicrystalline silane grafted polyolefins are used, surprisingly proved to be an additional advantage over the prior art. A possible explanation for this might be that the groups capable of crosslinking are very substantially present in the amorphous phase and, since the glass transition temperature of this ahiorphous phase is generally substantially below room temperature, are sufficiently mobile to be able to interact with one another.

To increase the crosslinking rate, a crosslinking accelerator, usually an organotin compound, such as, for example, dibutyltin dilaurate, may be added to the molding material. This can be effected either in pure form or, for better meterability, in the form of a master batch. The addition of the accelerator can be effected before melting in the form of a "dry blend" or after melting. Preferable contents of 0.001 to 20% by weight, and more preferably 0.01 to 5% by weight, in the master batch have proven suitable, so that the molding material then contains about 0.0001 to 1% by weight of crosslinking accelerator.

On the other hand, it is possible, if desired, to reduce the crosslinking rate by adding ungrafted, readily hydrolyzing silanes, such as hexadecyltrimethoxysilane or hexadecyltriethoxysilane. The water diffusing into the molding material is at least partly trapped by these silanes, so that it takes longer for the water required for crosslinking the silane-grafted polyolefin to be available in the molding material. For this purpose, it is advisable to use silanes having long-chain alkyl radicals since these do not evaporate during the melting of the product and are thus not lost as active substance and moreover do not give rise to any disposal or work safety problems. Whether the use of crosslinking accelerators or crosslinking retardants is required for one of the desired applications can be readily determined by one of ordinary skill in the art.

In a preferred embodiment, the crosslinked component (b) forms a three-dimensional network. On the one hand, the heat deflection temperature, which initially decreases slightly when the component (b) is incorporated into the component (a) by compounding, is raised again as a result of the crosslinking. On the other hand, the tendency to creep is greatly reduced by such a network. The elastic recovery, too, is improved by such a network. In addition, it has surprisingly been found that the impact strength, too, can be considerably improved in many cases by such a network.

In the formation of this network structure, it may be advantageous in some cases if the component (b) is not distributed in molecular disperse form in the mixture with the component (a) but forms a separate phase. In this case, only a slight reduction in the heat deflection temperature occurs after mixing of the two components. The heat deflection temperature can then be brought to a particularly high level by crosslinking.

A network phase can be produced on mixing in the melt when the viscosity ratio of the two phases and their volume ratio bear a specific relation to one another and a suitable shear rate is chosen according to means known to a person skilled in the art.

Most preferably, the component (a) is a blend of different thermoplastics. Here, the phase morphology of the component (a) can be particularly effectively stabilized by the presence of the component (b). This is due on one hand to the fact that the component (b) has an extremely strong adhesive effect. On the one hand, it is physically compatible with polyolefins; and on the other hand, it is capable of forming strong bonds with the functional groups which are present in polycondensates. The individual blend components of component (a) which are in principle incompatible with one another are thus effectively adhesively bonded to one another at the phase boundary.

In individual cases where such adhesion does not take place, for example owing to the lack of suitable functional groups, the phase morphology can nevertheless be stabilized by the formation of a three-dimensional, chemically crosslinked network. In these cases, the crosslinking can advantageously be carried out in the melt, for example by metering in water or other suitable crosslinking agents, such as, for example, diols. The coalescence of the individual phases is greatly hindered thereby.

Preferred stabilized polymer blends are described briefly below:

1) Blends of polyamides and thermoplastic polyesters generally have only poor mechanical properties and are brittle, owing to the incompatibility of the two polymers. By adding the component (b), the two phases can be adhesively bonded to one another, which greatly improves the mechanical properties. Owing to the water content of the polyamides, it is generally advisable first to premix the component (b) with the polyester and then to compound this mixture with the polyamide. Subsequent crosslinking by conditioning with water is as a rule superfluous here.

2) Blends of polyamides and polyolefins exhibit per se even more pronounced incompatibility phenomena. One possible method of making these components compatible with one another is, according to methods known in the art, to graft the polyolefin with, for example, maleic anhydride by a free radical method. In the case of polypropylene and related polymers, however, this results in a considerable decline in the molecular weight, which is undesired in this case, whereas the grafting of polyethylene leads to a considerable and likewise undesired increase in molecular weight. In addition, the use of such maleic anhydride-grafted polyolefins is generally unsuccessful owing to their poor availability. By premixing the component (b) with a polyolefin, such as, for example, the various polyethylene or polypropylene types, or with a polyolefin-based rubber, such as, for example, EPM or EPDM, on the other hand, a suitable blend component for a very wide range of polyamides is obtained in a simple manner.

3) The same applies to blends of thermoplastic polyesters and polyolefins or polyolefin-based rubbers. Here, the component (b) can be premixed either with the polyester or with the polyolefin or rubber. However, it is also possible in a particularly simple manner initially to take all components together and then to mix them. Depending on the intended use, it may also be advantageous in many cases to premix the component (b) with the polyester and then to react this mixture in the melt with a polyolefin or rubber which, according to the prior art, is grafted with an unsaturated carboxylic acid or with an unsaturated acid anhydride, such as, for example, maleic anhydride. This makes it possible to achieve particularly strong interphase adhesion. Suitable mixing units are the conventional kneaders or extruders, in particular twin-screw extruders.

The molding materials obtained can be processed by all conventional methods, for example by pressing, injection molding or extrusion, to give shaped articles.

EXAMPLES

Having generally described this invention, a further understanding can be obtained by reference to certain specific examples which are provided herein for purposes of illustration only and are not intended to be limiting unless otherwise specified.

Example 1

A substantially amorphous poly-α-olefin of the following monomer composition was used for the preparation of a silane-grafted polyolefin according to the invention:

6% by weight of ethene
64% by weight of propene
30% by weight of 1-butene.

In a twin-screw extruder (Berstorff ZE 40), a mixture consisting of 92.9% by weight of this poly-α-olefin,
6.0% by weight of vinyltrimethoxysilane (DYNASYLAN® VTMO) and
1.1 % by weight of dicumyl peroxide was mixed in the absence of air and moisture at a temperature of about 170° C. and kept at this temperature for a residence time of about 90 s. The excess VTMO was evaporated in the last zone of the extruder at a vacuum of about 20 mbar and condensed in cold traps. The product was stabilized by adding IRGANOX® 1076. Its melt viscosity at 190° C. was 6000 mPa.s.

Examples 2 to 5

Mixtures of an isotactic homopolypropylene (VESTOLEN® P 2000, DSM Polyolefine GmbH, Gelsenkirchen) with and without the product from Example 1 were prepared with the aid of a Werner & Pfleiderer twin-screw extruder to prepare Examples 2–5 and the Comparison, respectively. The mixtures were injection molded to give standard test specimens, with which a tensile test was carried out on the basis of DIN 53 455 (bar 4). A part of the standard test specimens was subjected to a hot water treatment before the tensile test, in order to crosslink at least a part of the silane-grafted poly-α-olefin. The results are shown in Table 1.

TABLE 1

Tensile test based on DIN 53 455, bar 4

|  | Comparison | Example 2 | Example 3 | Example 4 | Example 5 |
|---|---|---|---|---|---|
| VESTOLEN® P 2000 (parts by weight) | 100 | 90 | 80 | 70 | 60 |
| Product from Example 1 (parts by weight) |  | 10 | 20 | 30 | 40 |
| After storage for 2 days at room temperature in a desiccator: |  |  |  |  |  |
| $F_{max}$* (N) | 407 | 241 | 205 | 167 | 176 |
| Tensile strength (N/mm²) | 35.5 | 20.4 | 17.7 | 15.5 | 15.8 |
| After storage for 5 hours in a water bath at 80° C.: |  |  |  |  |  |
| $F_{max}$* (N) | 361 | 267 | 260 | 212 | 204 |
| Tensile strength (N/m²) | 29.6 | 27.4 | 24.9 | 19.1 | 17.8 |

*at the yield point

It is evident that $F_{max}$ and the tensile strength increase as a result of the water treatment even though the chosen conditions are far from sufficient for complete crosslinking. On further hot water treatment, further substantial improvements in the measurements are accordingly also achieved.

Starting from homopolypropylene, more flexible molding materials are preferably obtained by admixing silane-grafted poly-α-olefin, which molding materials, both in the fresh state and after hot water treatment, can be provided with firmly adhering coatings by treatment with conventional coating materials. In contrast, both the homopolypropylene and the blends thereof with unfunctionalized poly-α-olefin exhibit a pronounced poor adhesion of the coating.

In addition, it was found that the molding materials of Examples 2 to 5 have an increasingly smaller tendency to creep with increasing hot water treatment.

This application is based on German Patent Application DE-19808886.8, filed Mar. 3, 1998, the entire contents of which are hereby incorporated by reference.

Having now fully described the invention, it will be apparent to one of ordinary skill in the art that many changes and modifications can be made thereto without departing from the spirit or scope of the invention as set forth herein.

What is claimed is:

1. A molding material, comprising:
   (a) from more than 80 to 97 parts by weight of one or more thermoplastic polymer,
   (b) 3 to less than 20 parts by weight of a substantially amorphous, silane-grafted poly-α-olefin, wherein the grafting silane comprises at least one olefinic double bond and one to three alkoxy groups bonded directly to the silicon, and wherein the silane-grafted poly-α-olefin has a melt viscosity at 190° C. in the range of 100 to 50,000 mPa.s; and
   wherein the molding material comprises 0 to less than 0.5 parts by weight of a reinforcing agent.

2. The molding material as claimed in claim 1, wherein the thermoplastic polymer (a) is selected from the group consisting of a polyolefin, a polyphenylene ether, a polycondensate, a polyurethane, a rubber and a mixture thereof.

3. The molding material as claimed in claim 1, wherein the poly-α-olefin prior to grafting is substantially amorphous and is selected from the group consisting of an atactic polypropylene, an atactic poly-1-butene, an ethene/propene copolymer, an ethene/1-butene copolymer, an ethene/propene/1-butene terpolymer, a propene/1-butene copolymer, an ethene/propene/1-hexene terpolymer, an ethene/propene/1-octene terpolymer, an ethene/1-butene/1-hexene terpolymer, an ethene/1-butene/1-octene terpolymer, an ethene/1-hexene/1-octene terpolymer, a propene/1-butene/1-hexen terpolymer, a propene/1-butene/1-octene terpolymer, a propene/1-hexene/1-octene terpolymer, and a mixture thereof.

4. The molding material as claimed in claim 1, wherein the poly-α-olefin prior to grafting is substantially amorphous and comprises the following monomer composition:

0 to 95% by weight of an α-olefin having 4 to 10 carbon atoms, 5 to 100% by weight of propene, and 0 to 50% by weight of ethene.

5. The molding material as claimed in claim 1, wherein the ungrafted poly-α-olefin prior to grafting is substantially amorphous and comprises the following monomer composition:

3 to 95% by weight of an α-olefin having 4 to 10 carbon atoms, 5 to 97% by weight of propene, and 0 to 20% by weight of ethene.

6. The molding material as claimed in claim 1, wherein the substantially amorphous, silane-grafted poly-α-olefin has a melt viscosity of 1000 to 30,000 mPa.s.

7. The molding material as claimed in claim 1, further comprising a crosslinking accelerator.

8. The molding material as claimed in claim 1, wherein the silane-grafted, substantially amorphous poly-α-olefin is crosslinked.

9. The molding material as claimed in claim 8, wherein the crosslinked silane-grafted, substantially amorphous poly-α-olefin forms a three-dimensional network.

10. The molding material as claimed in claim 1, wherein the thermoplastic polymer (a) comprises a polymer blend.

11. The molding material as claimed in claim 10, wherein the polymer blend is a blend of a polyamide and a thermoplastic polyester.

12. The molding material as claimed in claim 10, wherein the polymer blend is a blend of a polyamide and a polyolefin.

13. The molding material as claimed in claim 10, wherein the polymer blend is a blend of a thermoplastic polyester and a polyolefin.

14. A molded article, comprising the molding material as claimed in claim 1.

15. A method for preparing a molding material comprising:

(a) 3 to 98 parts by weight of one or more thermoplastics, (b) 2 to 97 parts by weight of a substantially amorphous, silane-grafted poly-α-olefin, wherein the grafting silane comprises at least one olefinic double bond and one to three alkoxy groups bonded directly to the silicon, and wherein the silane-grafted poly-α-olefin has a melt viscosity at 190° C. in the range of 100 to 50,000 mPa.s; and wherein the molding material comprises 0 to less than 0.5 part by weight of a reinforcing agent, comprising grafting a substantially amorphous poly-α-olefin with the grafting silane, and melt mixing with one or more thermoplastic polymers.

16. The molding material of claim 2, wherein said polycondensate is selected from the group consisting of a polyester and a polyamide.

17. A method of preparing a shaped article comprising molding or extruding the molding material of claim 1.

* * * * *